United States Patent
Hosokawa

(10) Patent No.: US 6,649,285 B2
(45) Date of Patent: Nov. 18, 2003

(54) MAGNETO-OPTICAL RECORDING MEDIUM AND MANUFACTURING METHOD THEREFOR

(75) Inventor: Tetsuo Hosokawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 09/745,113

(22) Filed: Dec. 20, 2000

(65) Prior Publication Data

US 2002/0022153 A1 Feb. 21, 2002

(30) Foreign Application Priority Data

May 23, 2000 (JP) ........................................ 2000-151717

(51) Int. Cl.$^7$ ................................................ G11B 5/66
(52) U.S. Cl. .................. 428/694 ML; 428/694 DE; 428/694 RL; 428/694 MM; 428/694 EL; 428/694 GR; 428/694 RE; 428/900; 369/13.35; 369/13.38; 369/13.39; 369/13.41; 369/13.55; 369/13.54; 369/275.4; 365/122; 360/131; 360/135
(58) Field of Search ................ 428/694 ML, 694 DE, 428/694 RL, 694 MM, 694 EC, 694 GR, 694 RE, 900; 369/13.55, 13.54, 13.35, 13.38, 13.39, 13.41, 275.4; 365/122; 360/131, 135

(56) References Cited

U.S. PATENT DOCUMENTS 6,020,079 A * 2/2000 Matsumoto .......... 428/694 ML
6,333,899 B1 * 12/2001 Tamanoi et al. .............. 369/13
6,570,826 B2 * 5/2003 Hosokawa ............... 369/13.55

FOREIGN PATENT DOCUMENTS

| JP | 10124943 | 5/1998 |
| JP | 10188379 | 7/1998 |
| JP | 10293949 | 11/1998 |

* cited by examiner

Primary Examiner—Leszek Kiliman
(74) Attorney, Agent, or Firm—Greer, Burns & Crain Ltd.

(57) ABSTRACT

A magneto-optical recording medium includes a magnetic reproducing layer having an axis of easy magnetization in a direction perpendicular to its layer surface, a magnetic intermediate layer formed on the magnetic reproducing layer and having an axis of easy magnetization in a plane at a room temperature, and a magnetic recording layer formed on the magnetic intermediate layer and having an axis of easy magnetization in a direction perpendicular to its layer surface. The magnetic reproducing layer has a composition of $Gd_xFeCo_y$, where 22 at %$\leq$x$\leq$25 at % and 16 at %$\leq$y$\leq$23 at %.

9 Claims, 16 Drawing Sheets

MAGNETO-OPTICAL RECORDING MEDIUM AND MANUFACTURING METHOD THEREFOR

BACKGROUND OF THE INVENTION

1. Field of the Invention

The present invention relates to a magneto-optical recording medium allowing high-density recording and reproduction of information.

2. Description of the Related Art

A magneto-optical disk is known as a high-density recording medium, and an increase in its recording density is demanded with an increase in quantity of information. Increasing the recording density of the medium can be realized by shortening the space between adjacent recording marks. However, the reproduction of each recording mark is limited by the size of a light beam (beam spot) on the medium. In the case that the density of the recording marks is set so that only one recording mark is present inside the beam spot, an output waveform corresponding to "1" or "0" can be observed as a reproduced signal according to whether or not the recording mark is present inside the beam spot.

However, in the case that the density of the recording marks is increased so that a plurality of recording marks are present inside the beam spot, the reproduced output does not change irrespective of movement of the beam spot on the medium, so that the output waveform becomes linear and the presence or absence of recording marks cannot be distinguished. The reproduction of such small recording marks having a period shorter than the size of the beam spot may be effected by reducing the size of the beam spot. However, the size of the beam spot is limited by the wavelength $\lambda$ of light output from a light source and the numerical aperture NA of an objective lens, so that the spot size cannot be sufficiently reduced.

Recently commercially available is a magneto-optical disk drive adopting a reproducing method using a magnetically induced super-resolution (MSR) technique for reproducing a recording mark smaller than the size of the beam spot by the use of an existing optical system. The MSR is a reproducing method such that while one mark present inside the beam spot is being reproduced, another mark is masked to thereby increase a reproductive resolution. Accordingly, such an MSR disk medium requires at least a mask layer or reproducing layer for masking the other mark so that the one mark is reproduced during signal reproduction, in addition to a recording layer for recording marks.

A magneto-optical recording medium using a perpendicularly magnetized film as the reproducing layer is proposed in Japanese Patent Laid-open No. 3-88156, for example. In the prior art described in this publication, however, an initial magnetic field of several kilooersteds is required for initialization of the reproducing layer. Accordingly, the disk drive using this magneto-optical recording medium cannot be reduced in size. A magneto-optical recording medium using a magnetic film having an axis of easy magnetization in a plane at a room temperature and an axis of easy magnetization in a perpendicular direction at a predetermined temperature or higher as the reproducing layer is proposed in Japanese Patent Laid-open No. 5-81717, for example.

Further, an MSR medium having a reproducing layer, a recording layer, and an intermediate layer interposed between the reproducing layer and the recording layer is described in U.S. Pat. No. 6,020,079. In the MSR medium described in this U.S. Patent, a reproducing laser beam is directed onto the medium to form a temperature distribution composed of a low-temperature region, an intermediate-temperature region, and a high-temperature region inside the beam spot. The low-temperature region and the high-temperature region form a double mask, and a recorded mark is read from only the intermediate-temperature region. Since the double mask is formed by the low-temperature region and the high-temperature region, the intermediate-temperature region for reading a recorded mark can be greatly reduced in size, thereby allowing high-density recording and reproduction.

An MSR magneto-optical recording medium commercially available at present is either of a land recording type such that data is recorded on lands only or of a groove recording type such that data is recorded on grooves only. Attention has recently been given to a land/groove recording type such that data is recorded on both lands and grooves, so as to achieve higher-density recording and reproduction. In a magneto-optical recording medium adopting this land/groove recording type, a transparent substrate having a plurality of lands and a plurality of grooves alternately formed is used.

In the case that a magneto-optical recording film capable of performing MSR reproduction is formed on this substrate, there is a problem that a bias magnetic field required for erasure of data becomes large. This is considered to be due to the fact that the center distance between adjacent land and groove, i.e., the track pitch, is small, for example. When the track pitch is further reduced, a larger reproducing magnetic field is required in general. This tendency is remarkable especially in the reproduction at the grooves. The conventional medium has a tendency that when the composition of the medium, the film deposition conditions, etc. are selected so as to reduce the erasing magnetic field, the reproducing magnetic field becomes large in general.

To provide such a large erasing magnetic field and/or reproducing magnetic field, a large magnet must be installed in the magneto-optical disk drive, so that it is difficult to reduce the size of the magneto-optical disk drive. Further, a power consumption in the magneto-optical disk drive also becomes large. Also in the normal magneto-optical recording medium for recording data on only the lands or only the grooves, it is important to reduce the erasing magnetic field, thereby reducing the size of the magnet in the magneto-optical disk drive and reducing the power consumption in the magneto-optical disk drive.

SUMMARY OF THE INVENTION

It is therefore an object of the present invention to provide a magneto-optical recording medium which can reduce the erasing magnetic field.

It is another object of the present invention to provide a magneto-optical recording medium which can reduce not only the erasing magnetic field, but also the reproducing magnetic field.

It is a further object of the present invention to provide a land/groove recording type magneto-optical recording medium which can suppress an increase in the erasing magnetic field with a decrease in the track pitch.

In accordance with an aspect of the present invention, there is provided a magneto-optical recording medium comprising a magnetic reproducing layer having an axis of easy magnetization in a direction perpendicular to its layer surface; a magnetic intermediate layer formed on said magnetic reproducing layer and having an axis of easy magnetization in a plane at a room temperature; and a magnetic recording layer formed on said magnetic intermediate layer and having an axis of easy magnetization in a direction perpendicular to its layer surface; said magnetic reproducing layer having a composition of $Gd_xFeCo_y$ where 22 at $\% \leq x \leq 25$ at % and 16 at $\% \leq y \leq 23$ at %.

Preferably, said magnetic reproducing layer is formed from a rare earth-transition metal amorphous alloy film, and is transition metal-dominant such that the magnetic moment of transition metal is dominating over the magnetic moment of rare earth. Further, said magnetic intermediate layer has a Curie temperature of 200° C. or less, and a temperature at which the magnetization in said magnetic intermediate layer in the case of a single layer changes to perpendicular magnetization is 130° C. or more. More preferably, the magnetic intermediate layer is deposited by sputtering at a sputter rate of 7 nm/sec to 9 nm/sec under an Ar gas pressure of 2 Pa to 4 Pa.

In accordance with another aspect of the present invention, there is provided a magneto-optical recording medium comprising a GdFeCo reproducing layer having an axis of easy magnetization in a direction perpendicular to its layer surface, said reproducing layer having a thickness of 40 to 57 nm; a GdFeCoSi intermediate layer formed on said reproducing layer and having an axis of easy magnetization in a plane at a room temperature, said intermediate layer having a thickness of 38 to 50 nm; and a TbFeCo recording layer formed on said intermediate layer and having an axis of easy magnetization in a direction perpendicular to its layer surface.

Preferably, said reproducing layer has a composition of $Gd_xFeCo_y$ where 22 at $\% \leq x \leq 25$ at % and 16 at $\% \leq y \leq 23$ at %. Further, said reproducing layer has a thickness of 45 to 50 nm, and said intermediate layer has a thickness of 43 to 48 nm.

In accordance with a further aspect of the present invention, there is provided a magneto-optical recording medium for land and groove recording, comprising a transparent substrate having a plurality of lands and a plurality of grooves alternately formed; a magnetic reproducing layer formed on said transparent substrate and having an axis of easy magnetization in a direction perpendicular to its layer surface; a magnetic intermediate layer formed on said magnetic reproducing layer and having an axis of easy magnetization in a plane at a room temperature; and a magnetic recording layer formed on said magnetic intermediate layer and having an axis of easy magnetization in a direction perpendicular to its layer surface; said magnetic reproducing layer having a composition of $Gd_xFeCo_y$ where 22 at $\% \leq x \leq 25$ at % and 16 at $\% \leq y \leq 23$ at %.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
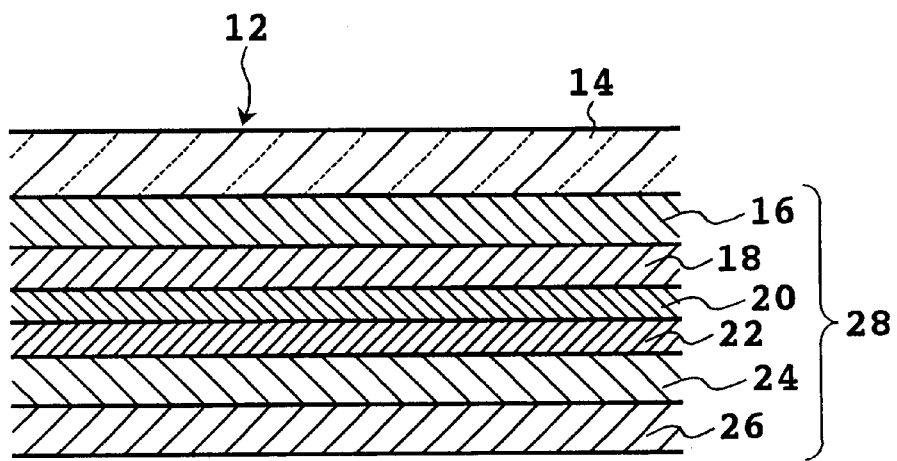
FIG. 1 is a vertical sectional view of a magneto-optical recording medium according to the present invention.

Referring to FIG. 1, there is shown a sectional view of a magneto-optical recording medium 12 according to the present invention. The magneto-optical recording medium 12 usually has the form of a disk. A dielectric layer 16 of SiN or the like is formed on a transparent substrate 14 of glass or the like by sputtering, for example. The dielectric layer 16 prevents oxidation and corrosion of a magnetic layer formed thereon. Resins such as polycarbonate, polymethylmethacrylate, and amorphous polyolefin may also be adopted as the transparent substrate 14. Further, metal nitrides such as AlN, metal oxides such as $SiO_2$ and $Al_2O_3$, and metal sulfides such as ZnS may also be adopted as the dielectric layer 16.

A magnetic reproducing layer 18 of GdFeCo is formed on the dielectric layer 16. The magnetic reproducing layer 18 has an axis of easy magnetization in a direction perpendicular to its layer surface. The magnetic reproducing layer 18 is metal-dominant, or metal-rich such that the magnetic moment of transition metal is dominating over the magnetic moment of rare earth. The Curie temperature of the magnetic reproducing layer 18 is about 250° C. to about 300° C.

A magnetic intermediate layer 20 of GdFeCoSi is formed on the magnetic reproducing layer 18. The magnetic intermediate layer 20 has an axis of easy magnetization in a plane at a room temperature. The axis (direction) of easy magnetization of the magnetic intermediate layer 20 changes from the in-plane to the perpendicular direction at a temperature higher than or equal to a predetermined temperature at which this layer 20 is heated by a reproducing beam power. As will be hereinafter described in detail, this predetermined temperature is preferably about 130° C. or more. The Curie temperature of the magnetic intermediate layer 20 is about 200° C. or less.

A magnetic recording layer 22 of TbFeCo is formed on the magnetic intermediate layer 20. The magnetic recording layer 22 has an axis of easy magnetization in a direction perpendicular to its layer surface. The Curie temperature of the magnetic recording layer 22 is about 250° C. to about 270° C. A protective layer 24 of SiN is formed on the magnetic recording layer 22. The protective layer 24 is provided for the purpose of preventing the entry of water or oxygen in the air or other substances such as halogen to protect the magnetic recording layer 22. Metal nitrides such as SIN, AlN, metal oxides such as $SiO_2$ and $Al_2O_3$, and metal sulfides such as ZnS may also be adopted as the protective layer 24. Further, a recording sensitivity adjusting layer (reflective layer) 26 of aluminum (Al) is formed on the protective layer 24. Thus, the magneto-optical recording medium 12 is completed.

As mentioned above, the magneto-optical recording medium 12 is configured by forming on the transparent substrate 14 a multilayer film 28 including the dielectric layer 16, the magnetic reproducing layer 18, the magnetic intermediate layer 20, the magnetic recording layer 22, the protective layer 24, and the recording sensitivity adjusting layer 26.

Figure 2:
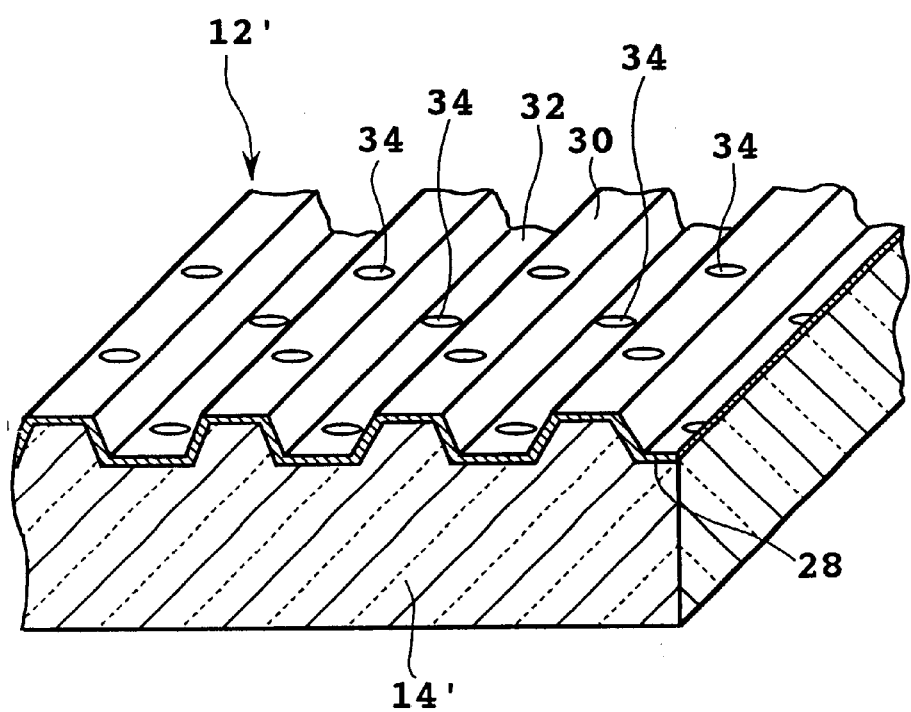
FIG. 2 is a fragmentary perspective view of a land/groove recording type magneto-optical recording medium.

Referring to FIG. 2, there is shown a magneto-optical recording medium 12' for land and groove recording. The multilayer film 28 is formed on a land/groove substrate 14' having a plurality of lands 30 and a plurality of grooves 32 alternately formed. The center distance (track pitch) between any adjacent ones of the lands 30 and the grooves 32 is 0.65 μm. The level difference between the lands 30 and the grooves 32 is 35 nm. Because the magneto-optical recording medium 12' is of a land/groove recording type, marks 34 are recorded on both the lands 30 and the grooves 32. The present invention is highly effective especially in the case of being applied to such a land/groove recording type magneto-optical recording medium having a small track pitch.

Figure 3:
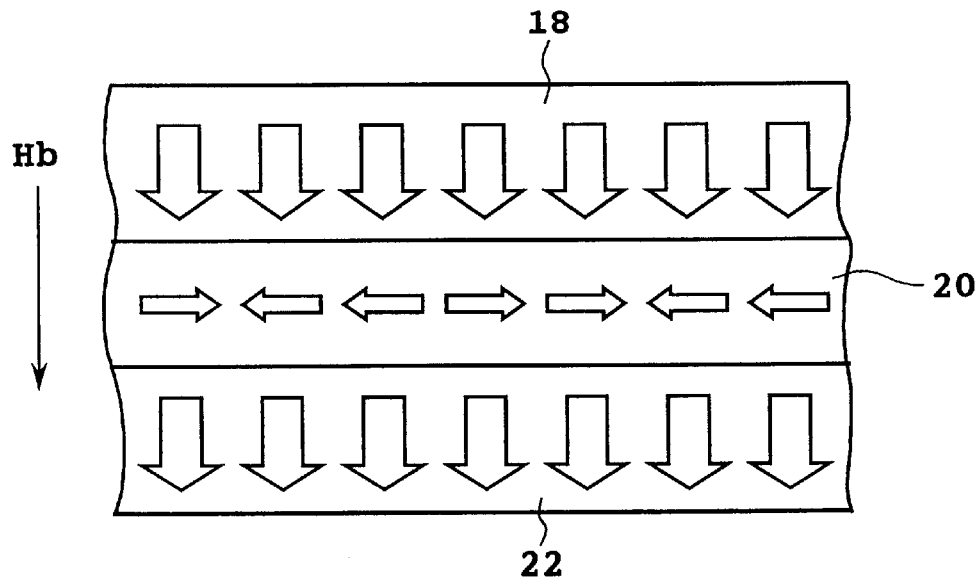
FIG. 3 is a vertical sectional view for illustrating data erasing in the present invention.

While a data erasing method, writing method, and reading method in the present invention are similar to those mentioned in U.S. Pat. No. 6,020,079 mentioned above, these methods will now be described in brief with reference to FIGS. 3 to 5. First, the data erasing method in the present invention will now be described with reference to FIG. 3. A laser beam is directed onto the recording medium as applying a bias magnetic field Hb in the downward direction to heat the recording layer 22 to a temperature higher than or equal to the Curie temperature of the recording layer 22, thereby ordering the magnetization in the recording layer 22 in the downward direction. When the recording medium is moved apart from the laser beam, the temperature of the recording medium lowers to room temperature. At room temperature, the intermediate layer 20 becomes a in-plane magnetized film, so that the reproducing layer 18 and the recording layer 22 become a magnetically uncoupled state. Accordingly, the magnetization in the reproducing layer 18 is ordered in the downward direction by the bias magnetic field Hb.

Figure 4:
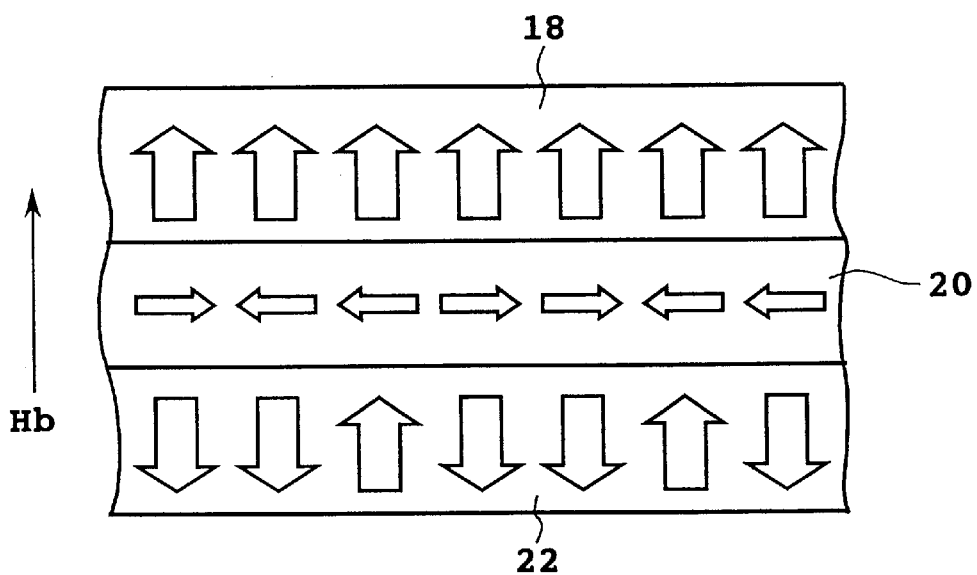
FIG. 4 is a vertical sectional view for illustrating data writing in the present invention.

The data writing method in the present invention will now be described with reference to FIG. 4. In writing data, an intense laser beam is directed onto only a recording portion on the medium as applying a bias magnetic field Hb in a direction opposite to the erasing direction, i.e., in the upward direction. As a result, the direction of the magnetization at only the recording portion is inverted to the upward direction. When the recording medium is moved apart from the laser beam, the temperature of the recording medium lowers to room temperature. At room temperature, the intermediate layer 20 becomes a in-plane magnetized film, so that the reproducing layer 18 and the recording layer 22 become a magnetically weak-coupled state. Accordingly, the magnetization in the reproducing layer 18 is ordered in the upward direction by the bias magnetic field Hb.

Figure 5A:
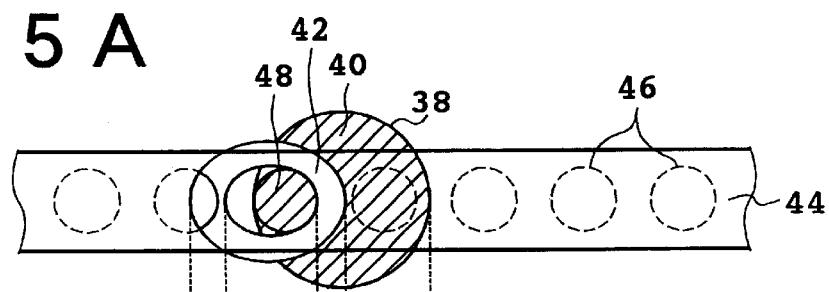
FIGS. 5A and 5B are a plan view and a vertical sectional view of a part of the recording medium, respectively, for illustrating a data reproducing method in the present invention.
Figure 5B:
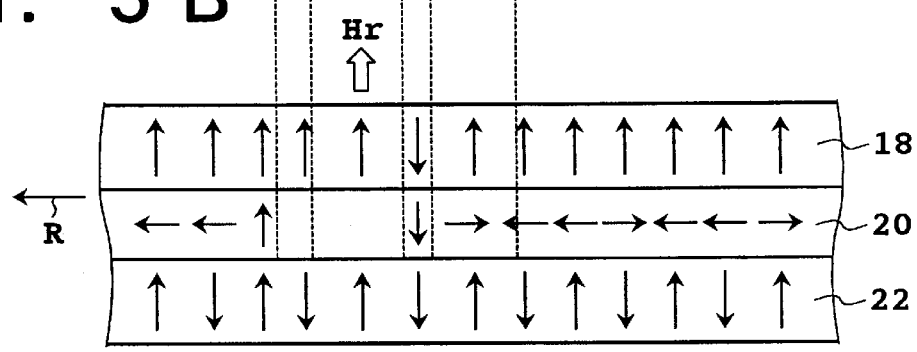

The data double-mask reproducing method in the present invention will now be described with reference to FIGS. 5A and 5B. When a sufficiently intense reproducing laser beam is directed onto the recording medium, there is formed in a beam spot 38 a low-temperature region where the magnetization in the reproducing layer 18 is oriented in the direction of a reproducing bias magnetic field Hr, an intermediate-temperature region where the magnetization in the recording layer 22 is transferred to the intermediate layer 20 and the reproducing layer 18 by exchange coupling, and a high-temperature region where the temperature in this region is not less than the Curie temperature Tc of the intermediate layer 20 as shown in FIGS. 5A and 5B. As shown in FIG. 5A, a plurality of marks 46 shown by the broken lines are formed in a track 44. In the low-temperature region and the high-temperature region, there are formed up-spin masks 40 and 48 where the direction of the magnetization in the reproducing layer 18 coincides with the direction of the bias magnetic field Hr. An opening 42 is formed in the intermediate-temperature region between the two up-spin masks 40 and 48.

At the up-spin mask 48, the recording medium is heated to a temperature not less than the Curie temperature Tc of the intermediate layer 20, so that the magnetization in the intermediate layer 20 disappears and the reproducing layer 18 and the recording layer 22 are not magnetically coupled with each other. Accordingly, the magnetization in the reproducing layer 18 at the up-spin mask 48 is oriented in the direction of the reproducing bias magnetic field Hr because the reproducing layer 18 has a small coercive force at room temperature. That is, the direction of the magnetization in the reproducing layer 18 is always upward at a temperature not less than the Curie temperature Tc of the intermediate layer 20, and the reproducing layer 18 at the up-spin mask 48 functions as a kind of mask through which no magneto-optical signal is output. Accordingly, the very small opening 42 through which data recorded in the recording layer 22 is read can be formed. Further, the opening 42 is formed at a central portion of the beam spot 38 where the laser intensity is higher than that at an edge portion of the beam spot 38, so that a large magneto-optical signal can be obtained.

As mentioned above, in the case that the track pitch becomes small as in a land/groove recording type magneto-optical recording medium, the magnetic field required for erasing tends to become large. There will now be described the present invention capable of reducing the erasing magnetic field required. A land/groove substrate with the center distance (track pitch) between adjacent land and groove set to 0.65 μm was prepared. The level difference between the lands and the grooves of this substrate was 35 nm. A stationary opposed type sputtering device having a plurality of deposition chambers (sputter chambers) each capable of achieving an ultimate vacuum of $5 \times 10^{-5}$ Pa or less was prepared.

First, the substrate was carried into the first chamber in which an Si target was mounted, and Ar gas and $N_2$ gas were introduced into the first chamber to deposit an SiN layer having a thickness of 90 nm on the substrate by reactive sputtering. The substrate was next moved into the second chamber in which a GdFeCo alloy target was mounted, and Ar gas was introduced into the second chamber to deposit a reproducing layer having a thickness of 50 nm by DC sputtering. The deposition conditions for the reproducing layer were 5.0 Pa for Ar pressure and 5.5 nm/sec for sputter rate. A plurality of targets for the reproducing layer were prepared by changing the compositions of Gd and Co to deposit a plurality of GdFeCo reproducing layers with the compositions of Gd and Co changed.

The substrate was next moved into the third chamber in which a $Gd_{28}Fe_{61}Co_3Si_8$ alloy target was mounted, and Ar gas was introduced into the third chamber to deposit an intermediate layer having a thickness of 40 nm. In depositing the intermediate layer, the sputter rate (power) and the Ar pressure were changed to deposit a plurality of intermediate layers. The substrate was next moved into the fourth chamber in which a $Tb_{22}Fe_{61}Co_{17}$ alloy target was mounted, and Ar gas was introduced into the fourth chamber to deposit a recording layer having a thickness of 50 nm under the deposition conditions that the sputter rate was fixed to 7 nm/sec and the Ar pressure was fixed to 7 Pa.

The substrate was next moved into the fifth chamber in which an Si target was mounted to deposit an SiN layer having a thickness of 25 nm on the recording layer under the same deposition conditions as those in the first chamber. Further, the substrate was next moved into the sixth chamber in which an Al target was mounted to deposit an Al layer having a thickness of 20 nm. Finally, a resin protective layer is formed on the multilayer film deposited on the substrate as above by spin coating to prepare a magneto-optical disk.

On the other hand, a disk tester was used for evaluation and measurement on the magneto-optical disk prepared above. The disk tester includes an optical pickup having a laser light source for outputting a laser beam having a wavelength of 650 nm and an objective lens having a numerical aperture NA of 0.55. The measurement was made by setting the linear velocity of the magneto-optical disk in the disk tester to 7.5 m/sec.

The evaluation of the erasing magnetic field was made according to the following procedure.

(1) A laser beam having a sufficient power is directed onto the medium as applying a sufficiently strong erasing magnetic field having a negative direction (downward direction) to the medium to completely erase the medium, i.e., to order the magnetization in the reproducing layer and the magnetization in the recording layer in the downward direction.

(2) A laser beam having a power of 7.5 mW is directed onto the medium as applying a magnetic field having a negative direction (downward direction) to the medium to record marks each having a size of 0.32 μm and measure a C/N.

(3) In the measurement in (2), the magnitude of the erasing magnetic field providing C/N=0 is set to Hwth.

Usually, in recording data, a laser beam having a recording power is directed onto the medium as applying a magnetic field having a positive direction (upward direction) to form recording marks magnetized upward. Even when a magnetic field having a negative direction is applied in recording data, upward magnetization may appear in some proportion if the magnitude of the magnetic field having the negative direction is small. That is, data may be recorded. Accordingly, Hwth is usually negative. The medium is erasable more easily, that is, the erasing magnetic field becomes smaller as Hwth becomes closer to 0.

Figure 6:
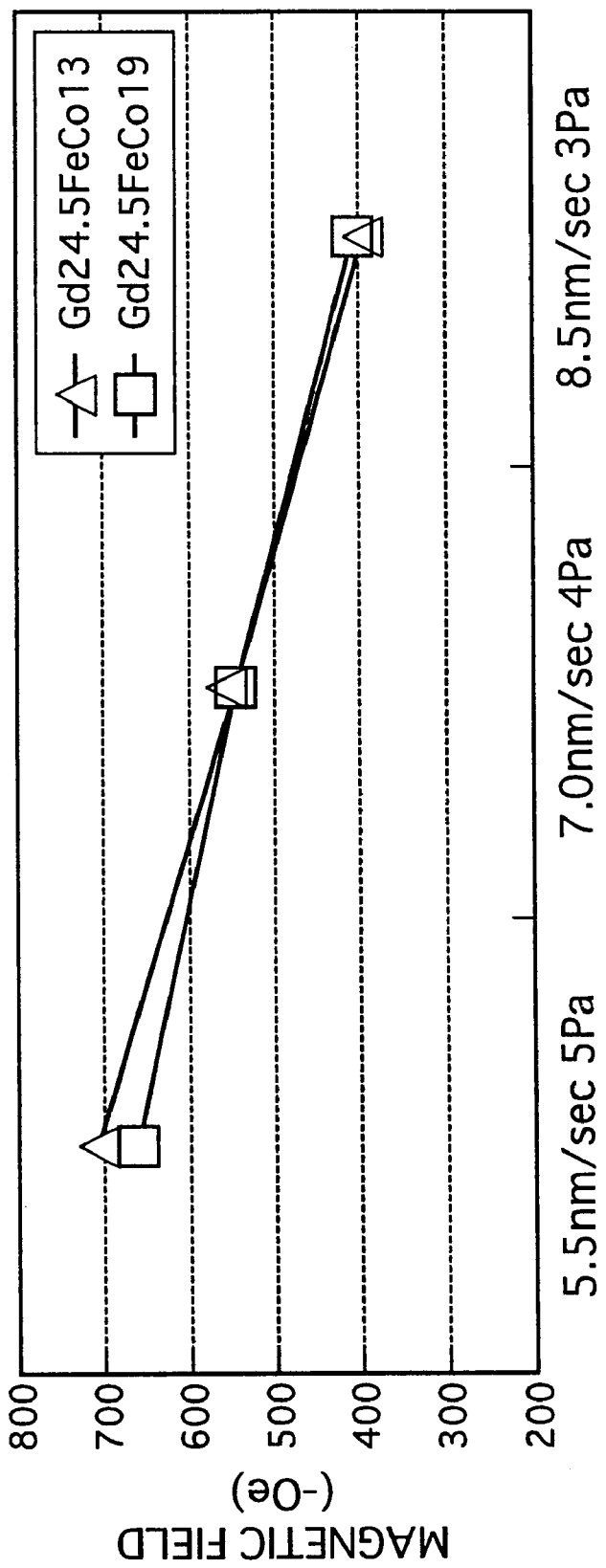
FIG. 6 is a graph showing the dependence of Hwth on the sputter conditions for the intermediate layer.

FIG. 6 shows the results of measurement of Hwth in the case that the composition of the reproducing layer was set to $Gd_{24.5}Fe_{62.5}Co_{13}$ and $Gd_{24.5}Fe_{56.5}Co_{19}$. That is, FIG. 6 shows the dependence of Hwth on the sputter conditions for the intermediate layer. For each composition of the reproducing layer, the sputter rate and the Ar pressure for the deposition of the intermediate layer were changed in three steps to form three kinds of intermediate layers. By using these intermediate layers, Hwth was measured.

As apparent from FIG. 6, Hwth becomes less than or equal to −500 oersteds (Oe) as a practical level by setting the sputter rate to a value greater than or equal to 7 nm/sec and the Ar pressure to a value less than or equal to 4 Pa in depositing the intermediate layer. This tendency is shown similarly both in the case of the $Gd_{24.5}Fe_{62.5}Co_{13}$ reproducing layer and in the case of the $Gd_{24.5}Fe_{56.5}Co_{19}$ reproducing layer. Accordingly, to sufficiently reduce the erasing magnetic field, the intermediate layer must be deposited at the Ar pressure less than or equal to 4 Pa and the sputter rate greater than or equal to 7 nm/sec.

Figure 7:
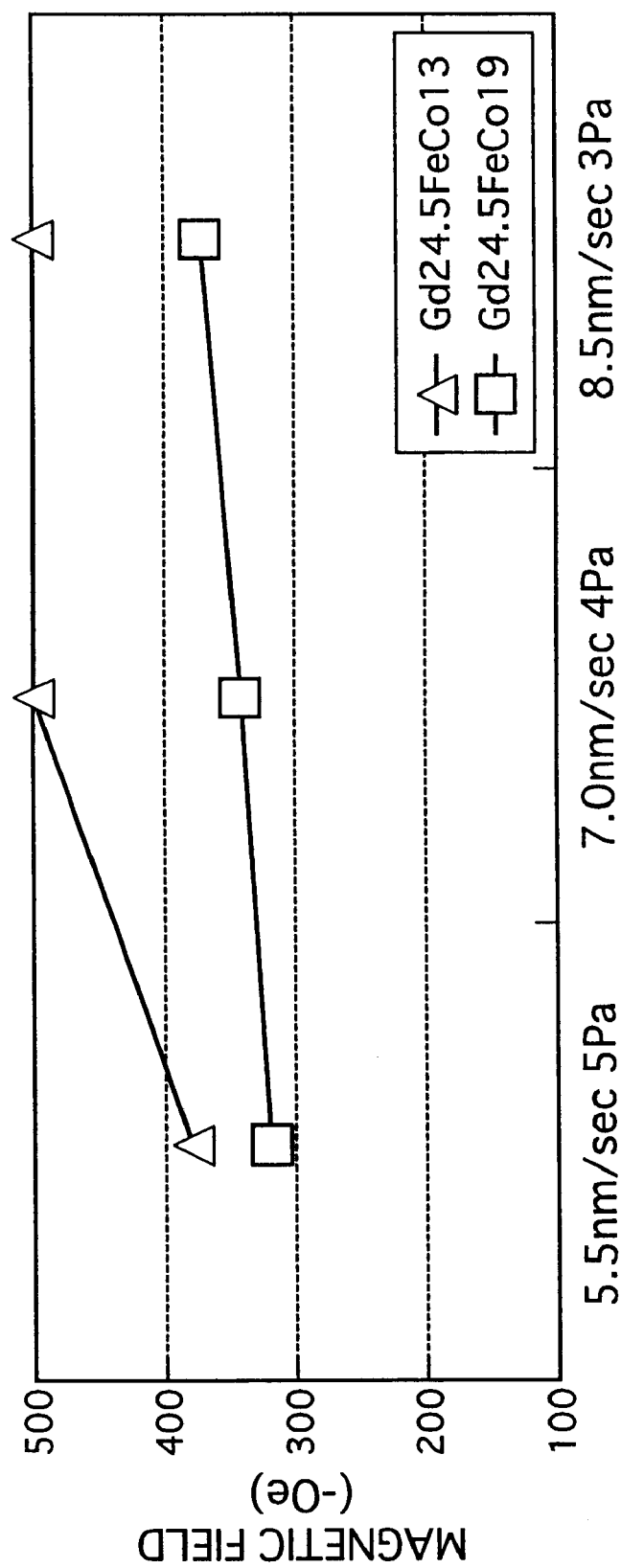
FIG. 7 is a graph showing the dependence of a reproducing magnetic field on the sputter conditions for the intermediate layer.

FIG. 7 shows the dependence of the reproducing magnetic field on the sputter conditions for the intermediate layer. That is, FIG. 7 shows the results of measurement of the magnetic field Hr required for reproduction in the case that the sputter conditions for the intermediate layer were changed in three steps. The reproducing magnetic field Hr is a minimum magnetic field required for a sufficient reduction in bit error rate in the environment at 65° C. As apparent from FIG. 7, in the case of the $Gd_{24.5}Fe_{56.5}Co_{19}$ reproducing layer, the reproducing magnetic field Hr hardly increases even though the sputter rate is increased and the Ar pressure is decreased in depositing the intermediate layer.

The sputter rate is adjusted by changing an applied power for sputtering. The sputter rate of 7 nm/sec in the sputtering device used herein corresponds to an applied power of 1.25 kW. On the other hand, in the case of the $Gd_{24.5}Fe_{62.5}Co_{13}$ reproducing layer, the reproducing magnetic field Hr remarkably increases with an increase in the sputter rate and a decrease in the Ar pressure in depositing the intermediate layer. That is, the reproducing magnetic field Hr increases under the conditions required for a reduction in Hwth shown in FIG. 6.

A similar experiment was carried out with the Co composition in the reproducing layer being changed in the range of 13 at % to 20 at %. As the result of this experiment, it was found that when the content of Co in the reproducing layer is increased up to 16 at % or more, the rise in the reproducing magnetic field can be suppressed and the erasing magnetic field can be simultaneously reduced in spite of an increase in the sputter rate and a decrease in the Ar pressure in depositing the intermediate layer.

Figure 8:
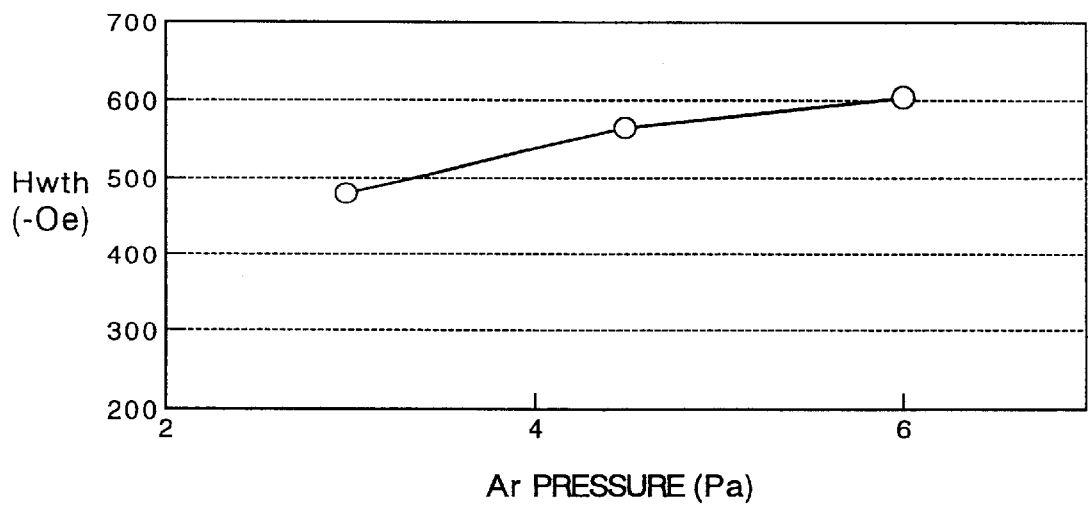
FIG. 8 is a graph showing the dependence of Hwth on the Ar pressure for the intermediate layer.
Figure 9:
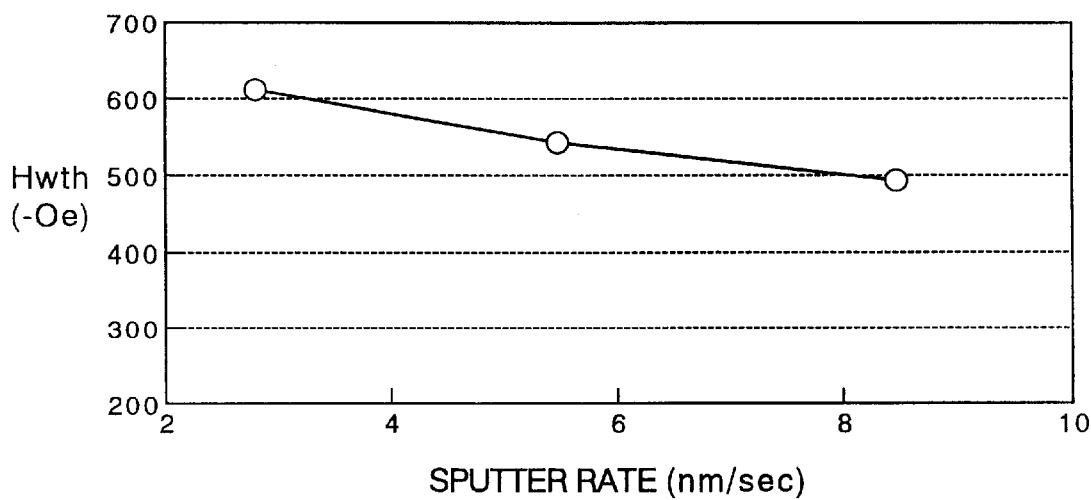
FIG. 9 is a graph showing the dependence of Hwth on the sputter rate for the intermediate layer.

FIG. 8 shows the dependence of Hwth on the Ar pressure for the intermediate layer in the case of the $Gd_{24.5}Fe_{56.5}Co_{19}$ reproducing layer. FIG. 9 shows the dependence of Hwth on the sputter rate for the intermediate layer in the case of the same reproducing layer as that in FIG. 8. As apparent from FIGS. 8 and 9, Hwth can be reduced by decreasing the Ar pressure and increasing the sputter rate in depositing the intermediate layer. The above-mentioned results show that the erasing magnetic field depends on the sputter conditions for the intermediate layer and that the erasing magnetic field can be reduced to −500 Oe or less by setting the sputter rate to 7 nm/sec or more and the Ar pressure to 4 Pa or less in depositing the intermediate layer.

While the sputter rate of 7 to 10 nm/sec may be considered good in terms of the data, the sputter rate is preferably included in such a range as to reduce the erasing magnetic field to −500 Oe or less. Further, while the Ar pressure of 2 to 4 Pa may be considered good in terms of the data, the Ar pressure is preferably included in such a range as to reduce the erasing magnetic field to −500 Oe or less. Further, the erasing magnetic field can be reduced with the rise in the reproducing magnetic field being suppressed, by increasing the Co composition in the GdFeCo reproducing layer to 16 at % or more.

Figure 10:
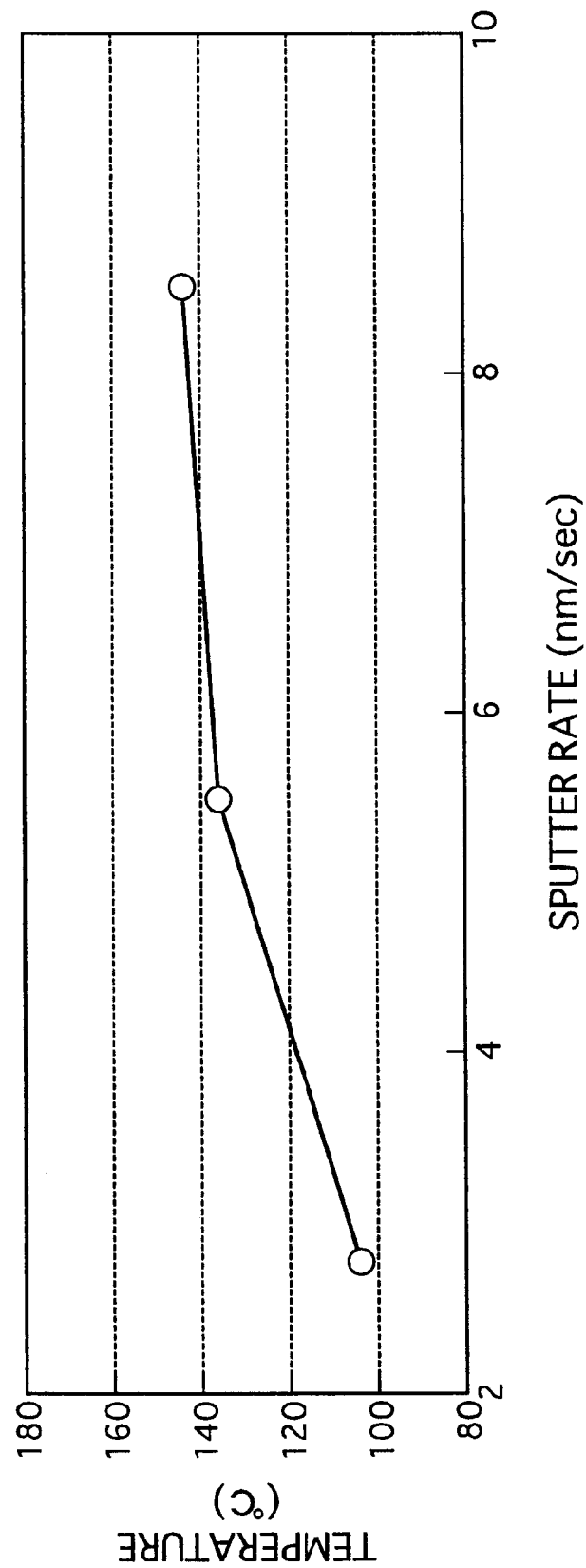
FIG. 10 is a graph showing the dependence of the temperature at which the magnetization in the intermediate layer changes from in-plane magnetization to perpendicular magnetization, on the sputter rate for the intermediate layer.
Figure 11:
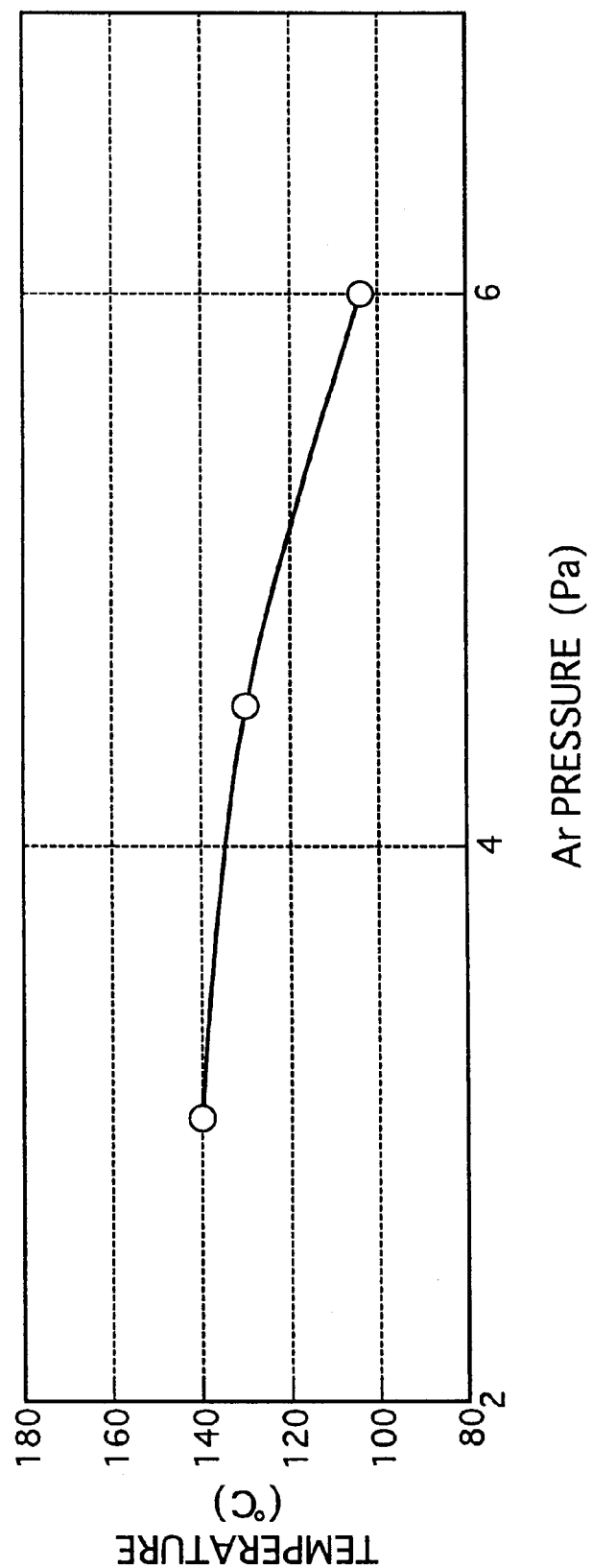
FIG. 11 is a graph showing the dependence of the in-plane-to-perpendicular magnetization changing temperature in the intermediate layer, on the Ar pressure for the intermediate layer.

FIG. 10 shows the dependence of a temperature at which the magnetization in the intermediate layer changes from in-plane magnetization to perpendicular magnetization, on the sputter rate for the intermediate layer. FIG. 11 shows the dependence of this in-plane-to-perpendicular magnetization changing temperature on the Ar pressure for the intermediate layer. As apparent from FIG. 10, the in-plane-to-perpendicular magnetization changing temperature rises with an increase in the sputter rate for the intermediate layer. Further, as apparent from FIG. 11, the in-plane-to-perpendicular magnetization changing temperature rises with a decrease in the Ar pressure for the intermediate layer.

These results show that the in-plane-to-perpendicular magnetization changing temperature at which the erasing magnetic field can be reduced is preferably set to 130° C. or more. Therefore, the in-plane-to-perpendicular magnetization changing temperature can be set to 130° C. or more by setting the sputter rate to a value greater than 4 nm/sec and the Ar pressure to a value less than 5 Pa. To stabilize the rear mask of the magneto-optical recording medium according to the present invention, the Curie temperature Tc of the intermediate layer is preferably set to 200° C. or less. If the Curie temperature Tc of the intermediate layer is higher than 200° C., the magnetic field strength and reproducing power required for formation of the rear mask become high, causing a problem that an operation margin becomes narrow.

Figure 12:
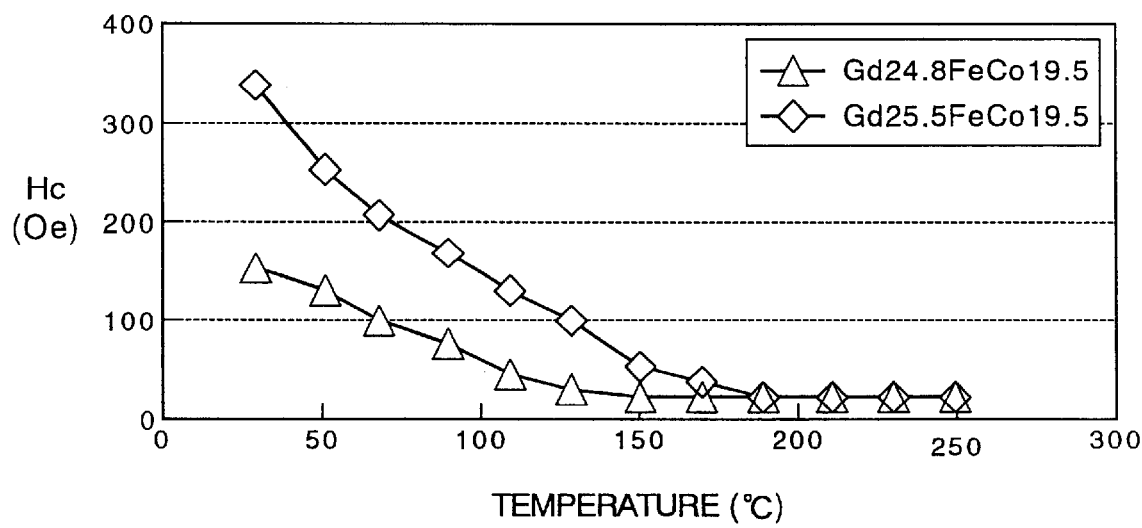
FIG. 12 is a graph showing the dependence of a coercive force-temperature characteristic of the reproducing layer on the Gd composition in the reproducing layer.

FIG. 12 shows the dependence of a coercive force (Hc)-temperature characteristic of the reproducing layer in the case of a single layer, on the Gd composition in the reproducing layer. As apparent from FIG. 12, the reproducing layer having a Gd composition of 25.5 at % shows a large coercive force Hc in the temperature range of room temperature to 200° C. Such a large coercive force Hc causes an increase in reproducing magnetic field required for formation of the rear mask. In the magneto-optical recording medium including the reproducing layer having a Gd composition of 25.5 at %, the magnetic field required for formation of the rear mask is 450 oersteds (Oe), which is greater than a practical level of 350 oersteds.

In the reproducing layer having a Gd composition of 24.8 at %, its coercive force Hc is about 180 oersteds at room temperature. This value for Hc is less than the practical level of 350 oersteds. However, if the Gd composition is greater than 25 at %, the magnetic field required for formation of the rear mask becomes large to such an extent that it exceeds the magnitude of the magnetic field that can be practically generated in a magneto-optical disk drive. Therefore, the Gd composition in the reproducing layer must be set to 25 at % or less.

Figure 13:
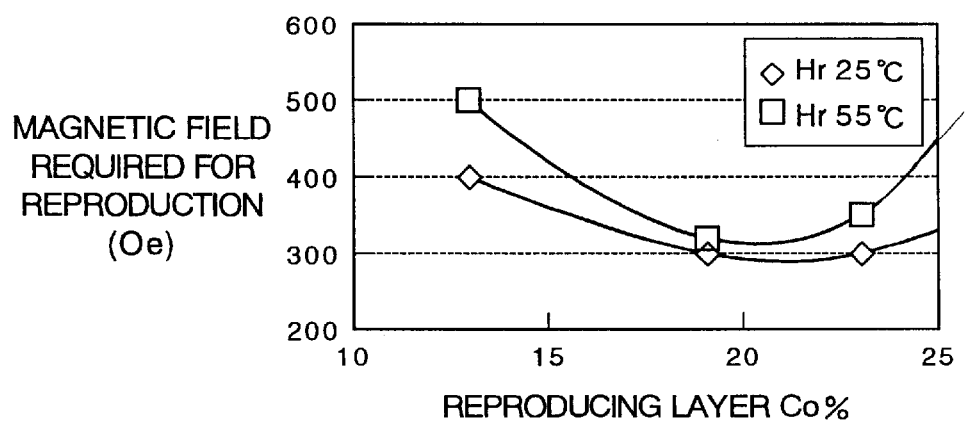
FIG. 13 is a graph showing the dependence of a reproducing magnetic field Hr on the Co composition in the reproducing layer.

FIG. 13 shows the dependence of a reproducing magnetic field Hr on the Co composition in the reproducing layer. The reproducing magnetic field Hr was measured in the environments at 25° C. and at 55° C. The Gd composition in the reproducing layer was fixed at 24.5 at %. Further, the intermediate layer was deposited under the sputter conditions that the sputter rate was set to 7 nm/sec and the Ar pressure was set to 4 Pa. As apparent from FIG. 13, the reproducing magnetic field can be reduced to the practical level of 350 oersteds (Oe) by setting the Co composition in the reproducing layer to 16 at % or more. If the Co composition is less than 16 at %, the reproducing magnetic field is greatly increased undesirably, especially at high temperatures.

Figure 14:
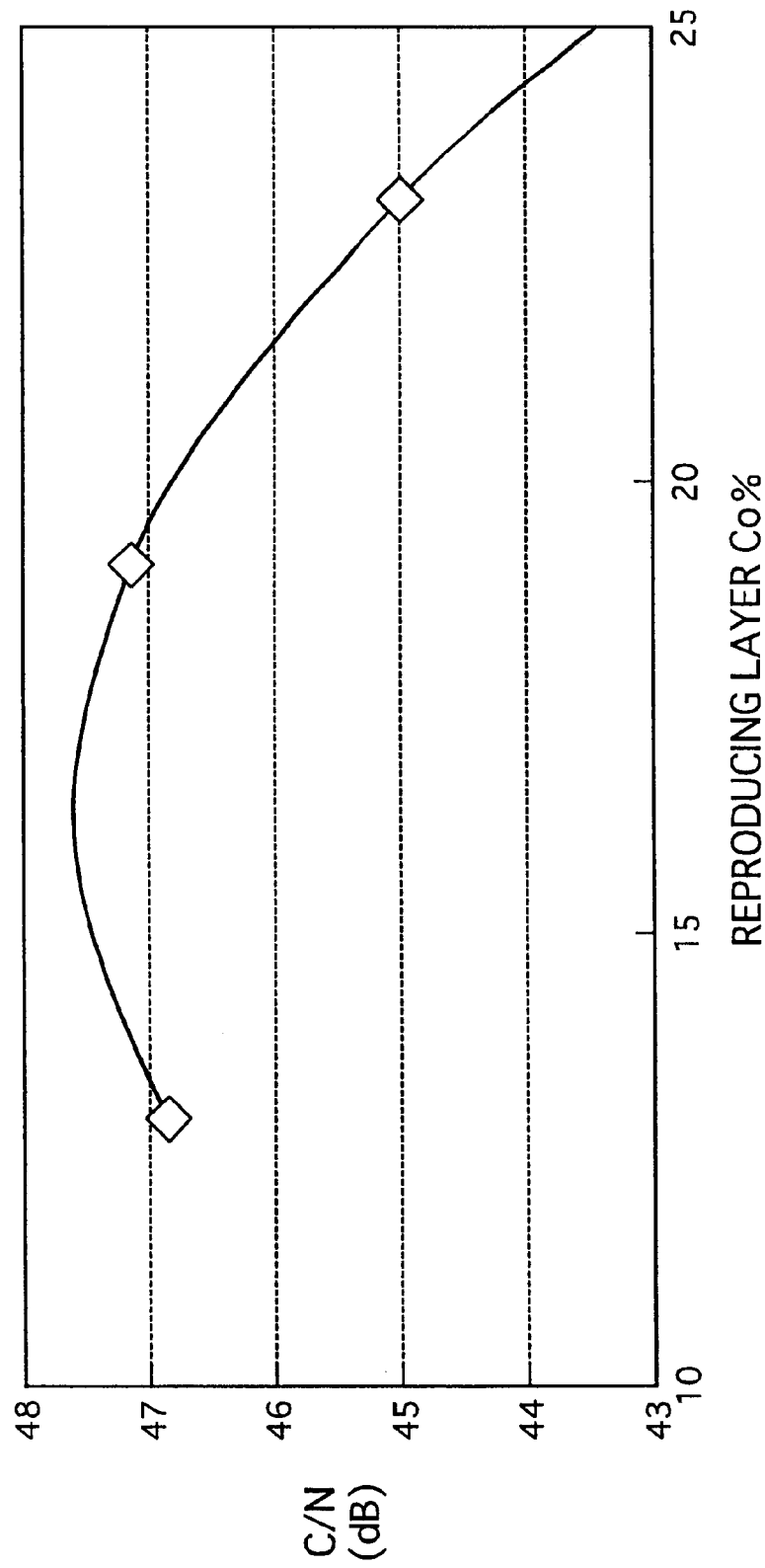
FIG. 14 is a graph showing the dependence of a C/N on the Co composition in the reproducing layer.

FIG. 14 shows the dependence of a C/N on the Co composition in the reproducing layer. The Gd composition in the reproducing layer and the sputter conditions for the intermediate layer are similar to those in the case of FIG. 13. As apparent from FIG. 14, when the Co composition in the reproducing layer is greater than 23 at %, the C/N undesirably becomes less than or equal to 45 dB. It is concluded from the results shown in FIGS. 13 and 14 that the Co composition in the reproducing layer is preferably set in the range of 16 to 23 at % providing the reproducing magnetic field of 400 Oe or less. More preferably, the Co composition in the reproducing layer is set in the range of 18 to 20 at % providing a minimum value of the reproducing magnetic field.

Figure 15:
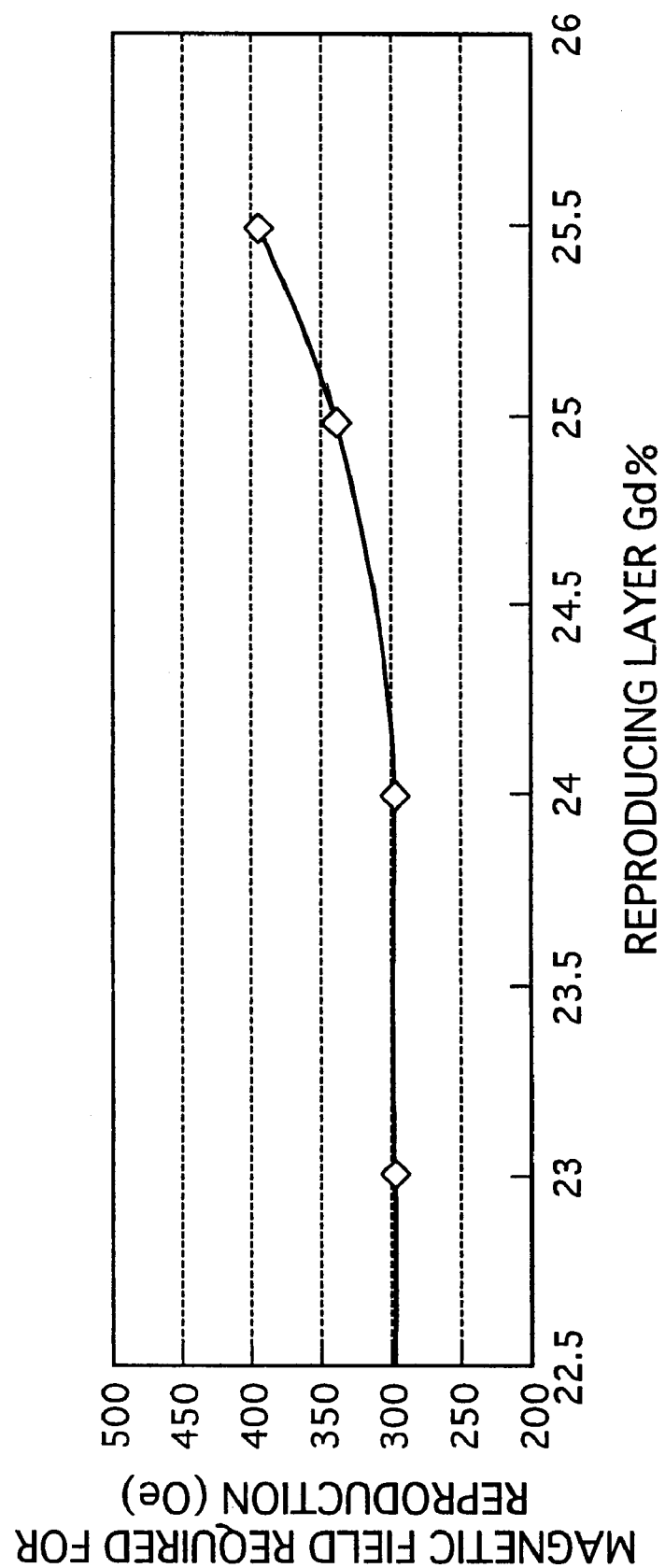
FIG. 15 is a graph showing the dependence of a reproducing magnetic field on the Gd composition in the reproducing layer.

FIG. 15 shows the dependence of a reproducing magnetic field Hr on the Gd composition in the reproducing layer. The Co composition in the reproducing layer was fixed at 19 at %. Further, the intermediate layer was deposited under the sputter conditions that the sputter rate was set to 7 nm/sec and the Ar pressure was set to 4 Pa. As apparent from FIG. 15, when the Gd composition in the reproducing layer is greater than 25 at %, the magnetic field required for formation of the rear mask is increased to cause an increase in the reproducing magnetic field Hr.

Figure 16:
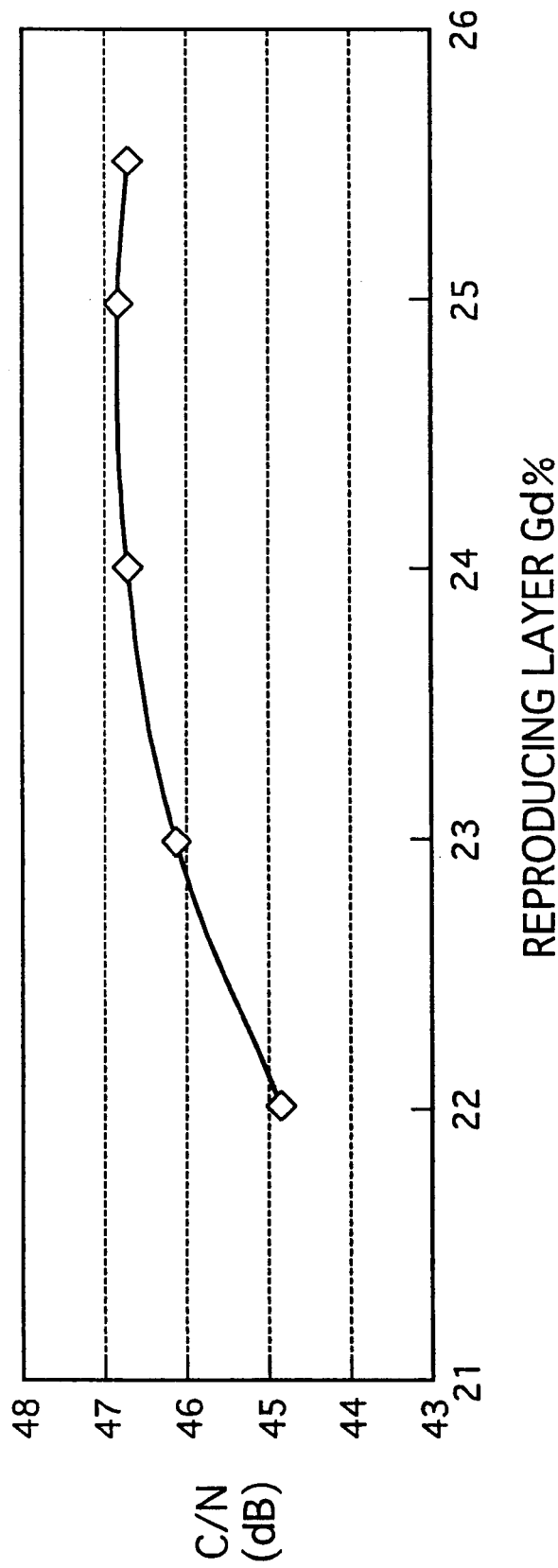
FIG. 16 is a graph showing the dependence of a C/N on the Gd composition in the reproducing layer.

FIG. 16 shows the dependence of a C/N on the Gd composition in the reproducing layer. The Co composition in the reproducing layer and the sputter conditions for the intermediate layer are similar to those in the case of FIG. 15. As apparent from FIG. 16, when the Gd composition in the reproducing layer is less than 22 at %, the C/N undesirably becomes less than or equal to 45 dB. It is concluded from the results shown in FIGS. 15 and 16 that the Gd composition in the reproducing layer is preferably set in the range of 22 to 25 at %.

Figure 17:
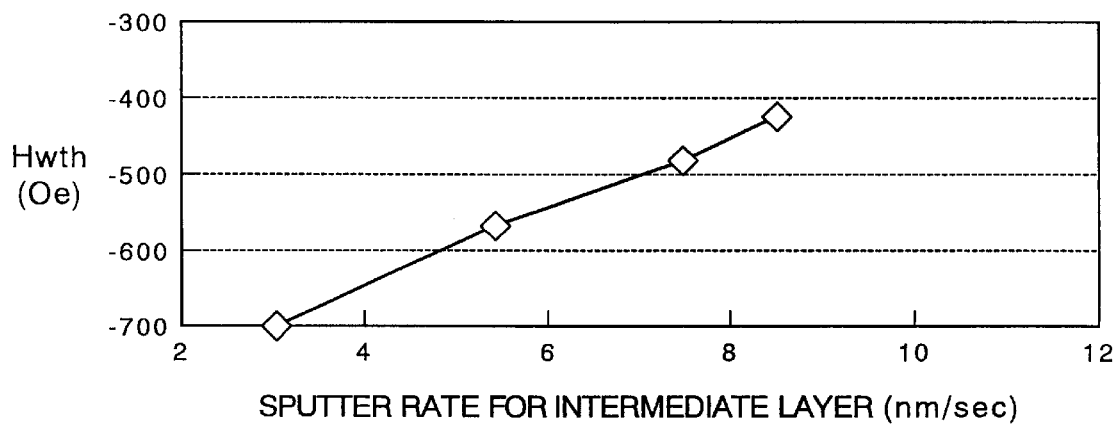
FIG. 17 is a graph showing the dependence of Hwth on the sputter rate for the intermediate layer.

FIG. 17 shows the dependence of Hwth on the sputter rate for the intermediate layer. The Ar pressure for the intermediate layer was fixed at 5.0 Pa. Further, the composition of the reproducing layer was set to $Gd_{24.5}Fe_{56.5}Co_{19}$. As apparent from FIG. 17, Hwth can be reduced to a practical level of −500 oersteds (Oe) or less by setting the sputter rate for the intermediate layer to 7 nm/sec or more.

Figure 18:
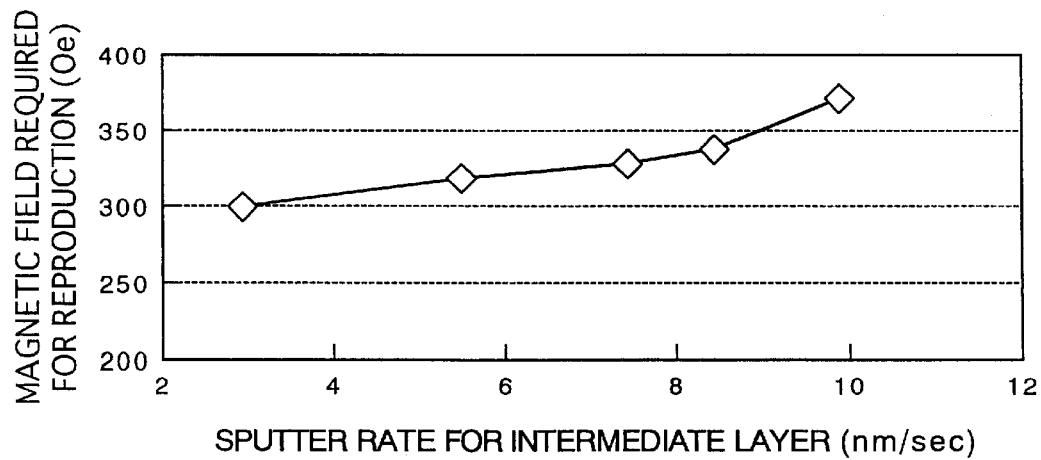
FIG. 18 is a graph showing the dependence of a reproducing magnetic field Hr on the sputter rate for the intermediate layer.

FIG. 18 shows the dependence of a reproducing magnetic field Hr on the sputter rate for the intermediate layer. The composition of the reproducing layer and the Ar pressure for the intermediate layer are similar to those in the case of FIG. 17. As apparent from FIG. 18, when the sputter rate for the intermediate layer is greater than 9 nm/sec, the reproducing magnetic field Hr undesirably becomes greater than a practical level of 350 oersteds (Oe). It is concluded from the results shown in FIGS. 17 and 18 that the sputter rate for the intermediate layer is preferably set in the range of 7 to 9 nm/sec.

Figure 19:
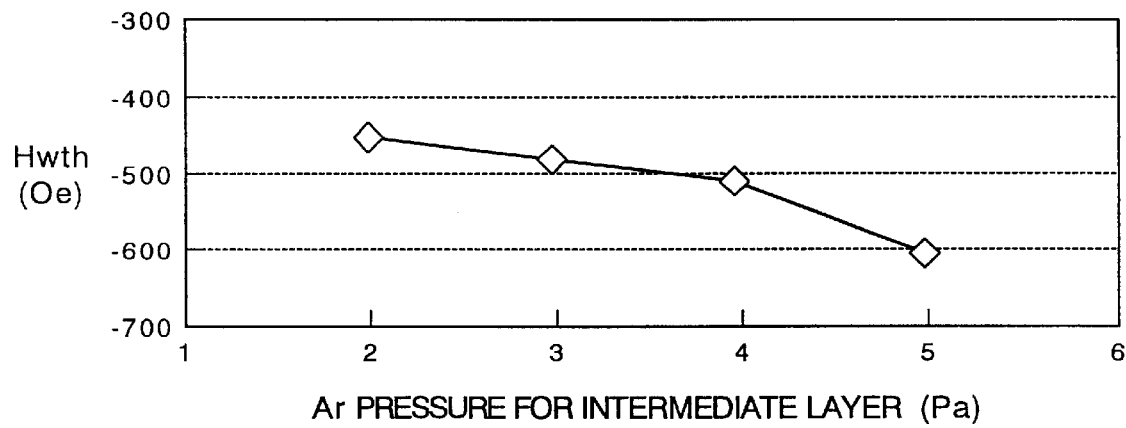
FIG. 19 is a graph showing the dependence of Hwth on the Ar pressure for the intermediate layer.

FIG. 19 shows the dependence of Hwth on the Ar pressure for the intermediate layer. The sputter rate for the intermediate layer was fixed at 5.5 nm/sec. The composition of the reproducing layer was set to $Gd_{24.5}Fe_{56.5}Co_{19}$. As apparent from FIG. 19, Hwth can be reduced to −500 oersteds (Oe) or less by setting the Ar pressure to 4 Pa or less in depositing the intermediate layer.

Figure 20:
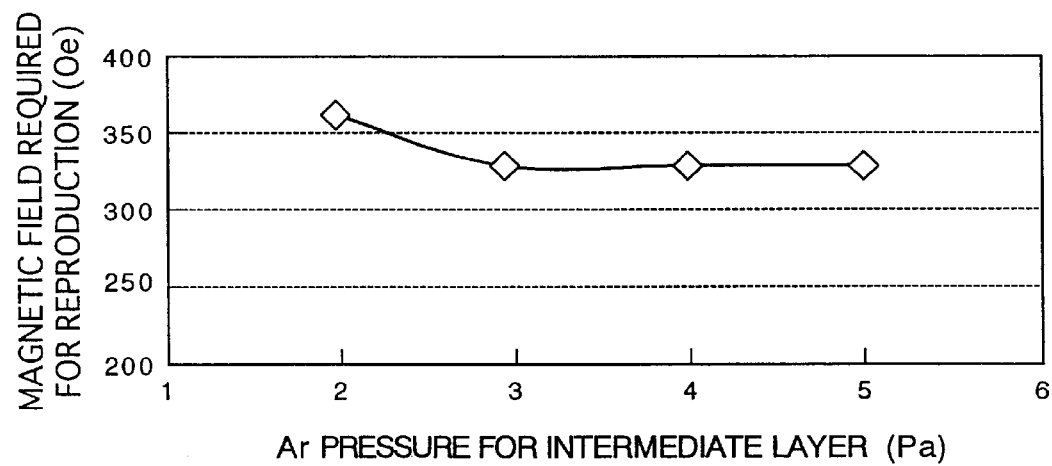
FIG. 20 is a graph showing the dependence of a reproducing magnetic field Hr on the Ar pressure for the intermediate layer.

FIG. 20 shows the dependence of a reproducing magnetic field Hr on the Ar pressure for the intermediate layer. The sputter rate for the intermediate layer and the composition of the reproducing layer are similar to those in the case of FIG. 19. As apparent from FIG. 20, when the Ar pressure for the intermediate layer is less than 2 Pa, the reproducing magnetic field Hr undesirably becomes greater than the practical level of 350 oersteds (Oe). It is concluded from the results shown in FIGS. 19 and 20 that the Ar pressure for the intermediate layer is preferably set in the range of 2 to 4 Pa.

There will now be described the thickness of the reproducing layer and the thickness of the intermediate layer providing the consistency of the reproducing magnetic field and the C/N with reference to FIGS. 21 to 24. The compositions of the reproducing layer, the intermediate layer, and the recording layer are GdFeCo, GdFeCoSi, and TbFeCo, respectively.

Figure 21:
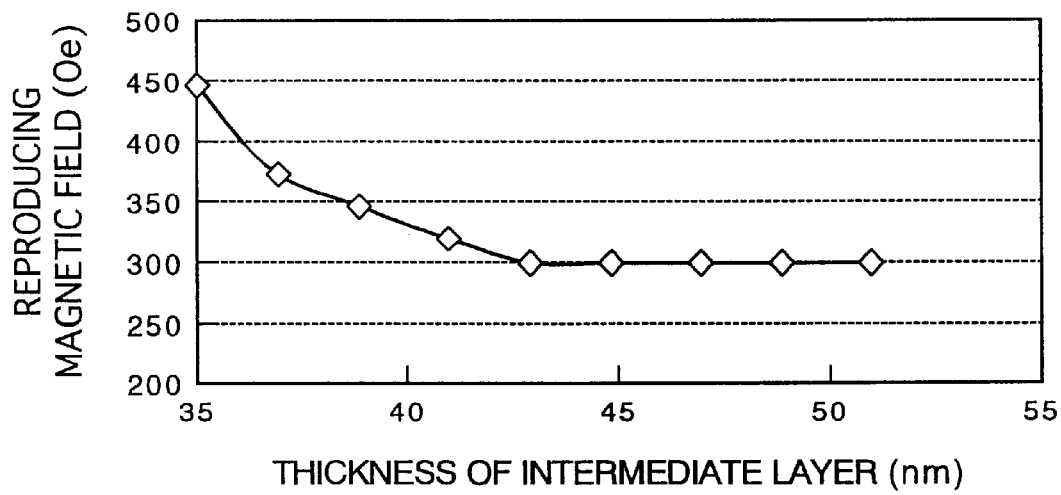
FIG. 21 is a graph showing the dependence of a required reproducing magnetic field on the thickness of the intermediate layer.
Figure 22:
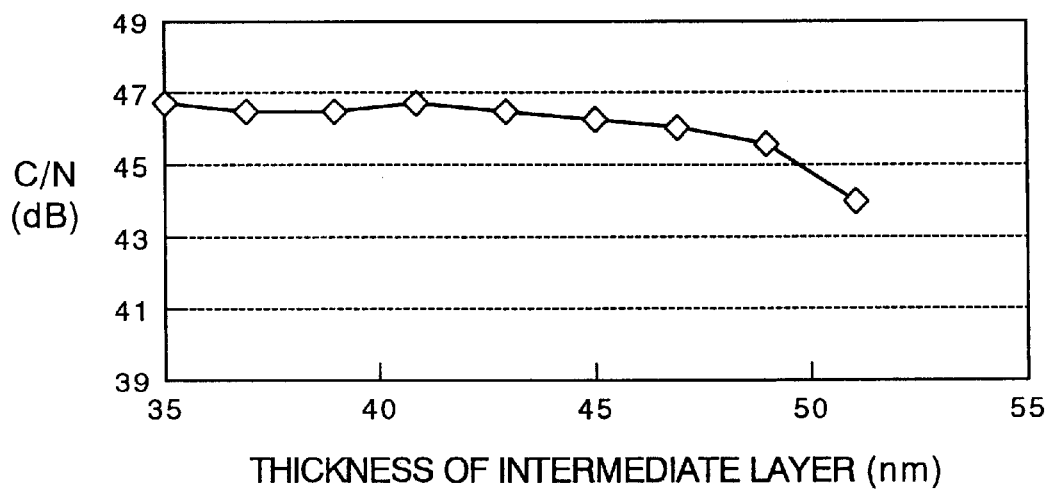
FIG. 22 is a graph showing the dependence of a C/N on the thickness of the intermediate layer.

FIG. 21 shows the dependence of the required reproducing magnetic field on the thickness of the intermediate layer. FIG. 22 shows the dependence of the C/N on the thickness of the intermediate layer. As apparent from FIGS. 21 and 22, the thickness of the intermediate layer is preferably set in the range where the reproducing magnetic field and the C/N are consistent with each other, i.e., in the range of 38 to 50 nm. More preferably, the thickness of the intermediate layer is set in the range of 43 to 48 nm where the C/N is satisfactory and the reproducing magnetic field becomes minimum.

Figure 23:
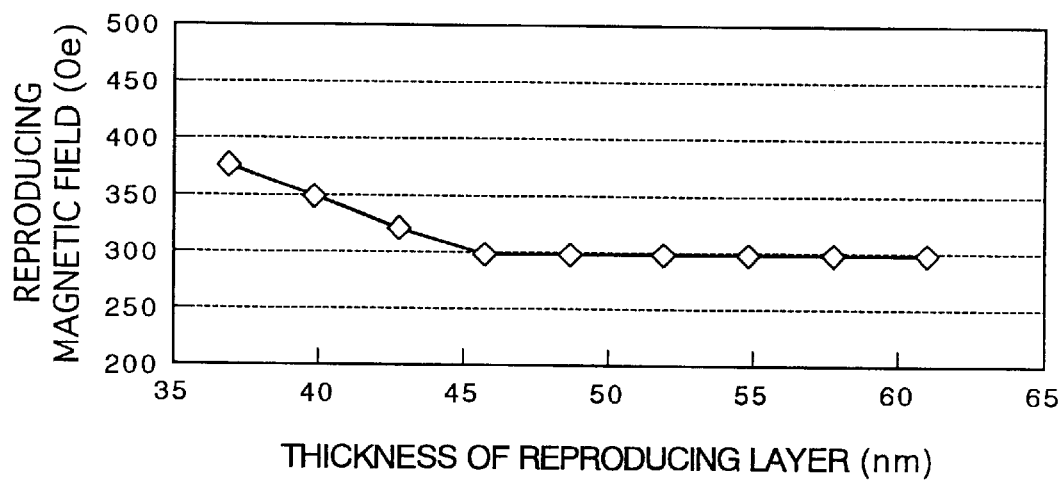
FIG. 23 is a graph showing the dependence of a required reproducing magnetic field on the thickness of the reproducing layer.
Figure 24:
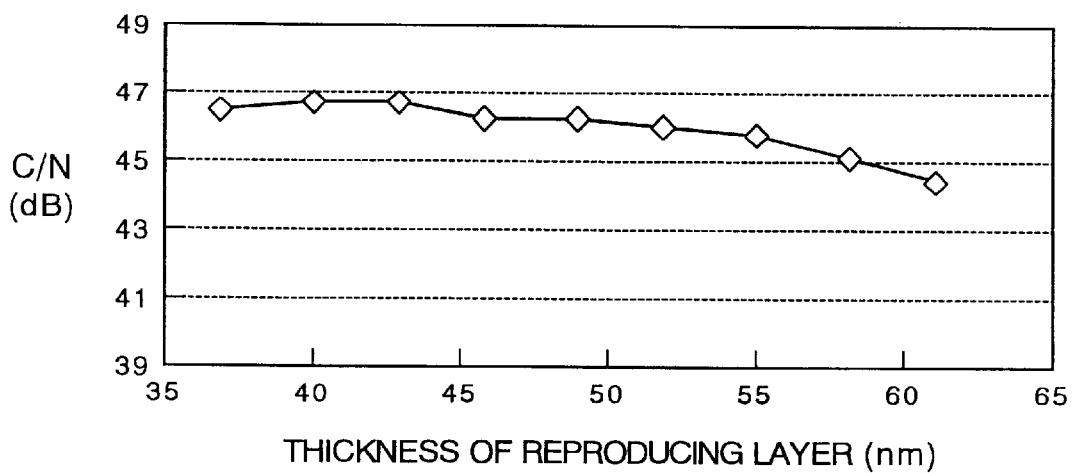
FIG. 24 is a graph showing the dependence of a C/N on the thickness of the reproducing layer.

FIG. 23 shows the dependence of the required reproducing magnetic field on the thickness of the reproducing layer. FIG. 24 shows the dependence of the C/N on the thickness of the reproducing layer. As apparent from FIGS. 23 and 24, the thickness of the reproducing layer is preferably set in the range where the reproducing magnetic field and the C/N are consistent with each other, i.e., in the range of 40 to 57 nm. More preferably, the thickness of the reproducing layer is set in the range of 45 to 50 nm.

As apparent from the above description, it is considered that the material of the reproducing layer and the deposition conditions for the intermediate layer are related with each other. Further, it is also considered that the C/N and the magnetic field strength are influenced by the interaction between the reproducing layer and the intermediate layer, and it is therefore possible to improve the C/N and the magnetic field strength according to the material of the reproducing layer and the deposition conditions for the intermediate layer solely or in combination.

According to the present invention as described above, it is possible to provide a high-density magneto-optical recording medium which can reduce the erasing magnetic field with an increase in reproducing magnetic field being suppressed, by defining the composition ranges of Gd and Co in the magnetic reproducing layer. Accordingly, a magneto-optical disk drive using this recording medium can be reduced in size and a reduction in its power consumption can be attained.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A magneto-optical recording medium comprising:
   a magnetic reproducing layer having an axis of easy magnetization in a direction perpendicular to its layer surface;
   a magnetic intermediate layer formed on said magnetic reproducing layer and having an axis of easy magnetization in a plane at a room temperature; and
   a magnetic recording layer formed on said magnetic intermediate layer and having an axis of easy magnetization in a direction perpendicular to its layer surface;
   wherein said magnetic reproducing layer has a composition of $Gd_xFeCo_y$ where 22 at $\% \leq x \leq 25$ at $\%$ and 16 at $\% \leq y \leq 23$ at $\%$.

2. A magneto-optical recording medium according to claim 1, wherein said magnetic reproducing layer is formed from a rare earth-transition metal amorphous alloy film, and is transition metal-dominant such that the magnetic moment of transition metal is dominating over the magnetic moment of rare earth.

3. A magneto-optical recording medium according to claim 1, wherein said magnetic intermediate layer has a Curie temperature of 200° C. or less, and a temperature at which the magnetization in said magnetic intermediate layer in the case of a single layer changes to perpendicular magnetization is 130° C. or more.

4. A magneto-optical recording medium according to claim 1, further comprising:
   a transparent substrate having a plurality of lands and a plurality of grooves alternately formed;
   wherein said magnetic reproducing layer is formed on said transparent substrate.

5. A manufacturing method for a magneto-optical recording medium comprising a magnetic reproducing layer having an axis of easy magnetization in a direction perpendicular to its layer surface; a magnetic intermediate layer formed on said magnetic reproducing layer and having an axis of easy magnetization in a plane at a room temperature; and a magnetic recording layer formed on said magnetic intermediate layer and having an axis of easy magnetization in a direction perpendicular to its layer surface; said magnetic reproducing layer having a composition of $Gd_xFeCo_y$ where 22 at $\% \leq x \leq 25$ at $\%$ and 16 at $\% \leq y \leq 23$ at $\%$, said manufacturing method comprising the step of:
   depositing said magnetic intermediate layer by sputtering at a sputter rate of 7 nm/sec to 9 nm/sec under an Ar gas pressure of 2 Pa to 4 Pa.

6. A magneto-optical recording medium comprising:
   a GdFeCo reproducing layer having an axis of easy magnetization in a direction perpendicular to its layer surface, said reproducing layer having a thickness of 40 to 57 nm;

a GdFeCoSi intermediate layer formed on said reproducing layer and having an axis of easy magnetization in a plane at a room temperature, said intermediate layer having a thickness of 38 to 50 nm; and a TbFeCo recording layer formed on said intermediate layer and having an axis of easy magnetization in a direction perpendicular to its layer surface, wherein said reproducing layer has a composition of $Gd_xFeCo_y$, where 22 at %$\leq$x$\leq$25 at % and 16 at %$\leq$y$\leq$23 at %.

7. A magneto-optical recording medium according to claim 6, wherein said reproducing layer has a thickness of 45 to 50 nm, and said intermediate layer has a thickness of 43 to 48 nm.

8. A magneto-optical recording medium according to claim 6, wherein said intermediate layer has a Curie temperature of 200° C. or less, and a temperature at which the magnetization in said intermediate layer in the case of a single layer changes to perpendicular magnetization is 130° C. or more.

9. A manufacturing method for a magneto-optical recording medium comprising a GdFeCo reproducing layer having an axis of easy magnetization in a direction perpendicular to its layer surface, said reproducing layer having a thickness of 40 to 57 nm; a GdFeCoSi intermediate layer formed on said reproducing layer and having an axis of easy magnetization in a plane at a room temperature, said intermediate layer having a thickness of 38 to 50 nm; and a TbFeCo recording layer formed on said intermediate layer and having an axis of easy magnetization in a direction perpendicular to its layer surface; said reproducing layer having a composition of $Gd_xFeCo_y$, where 22 at %$\leq$x$\leq$25 at % and 16 at %$\leq$y$\leq$23 at %, said manufacturing method comprising the step of:

depositing said intermediate layer by sputtering at a sputter rate of 7 nm/sec to 9 nm/sec under an Ar gas pressure of 2 Pa to 4 Pa.

* * * * *